United States Patent [19]

Oliver et al.

[11] Patent Number: 4,797,317

[45] Date of Patent: Jan. 10, 1989

[54] SOLAR CONTROL WINDOW FILM

[75] Inventors: Dell B. Oliver, Gilbert; Peter Jahoda, Chandler, both of Ariz.

[73] Assignee: Gila River Products, Inc., Chandler, Ariz.

[21] Appl. No.: 895,513

[22] Filed: Aug. 11, 1986

Related U.S. Application Data

[63] Continuation of Ser. No. 655,336, Sep. 27, 1984, abandoned.

[51] Int. Cl.⁴ ............................. B32B 5/14; B32B 7/02
[52] U.S. Cl. ................................. 428/204; 428/209; 428/212; 428/354; 428/430; 428/441; 428/447; 428/458; 428/461; 428/480; 428/483
[58] Field of Search ................. 428/40, 447, 480, 483, 428/458, 461, 430, 441, 910, 204, 209, 212, 354

[56] References Cited

U.S. PATENT DOCUMENTS

| | | | |
|---|---|---|---|
| 3,078,693 | 2/1963 | Lytle | 65/60 |
| 3,290,203 | 12/1966 | Antonson et al. | 161/4 |
| 3,305,336 | 2/1967 | Browne et al. | 65/60 |
| 3,398,040 | 8/1968 | Allen et al. | 161/45 |
| 3,414,503 | 12/1968 | Brichard | 204/298 |
| 3,499,697 | 3/1970 | Edwards | 350/1 |
| 3,798,146 | 3/1974 | Wan et al. | 204/192 |
| 3,907,660 | 9/1975 | Gillery | 204/298 |
| 3,949,134 | 4/1976 | Willdorf | 428/215 |
| 3,956,559 | 5/1976 | Willdorf | 428/214 |
| 3,984,591 | 10/1976 | Plumat et al. | 427/165 |
| 4,102,768 | 7/1978 | Kearin et al. | 204/192 |
| 4,112,171 | 9/1978 | Motter et al. | 428/213 |
| 4,157,417 | 6/1979 | Murphy | 428/344 |
| 4,226,910 | 10/1980 | Dahlen et al. | 428/336 |
| 4,247,599 | 1/1981 | Hopper | 428/458 |
| 4,634,637 | 1/1987 | Oliver et al. | 428/458 |

*Primary Examiner*—George F. Lesmes
*Assistant Examiner*—P. R. Schwartz
*Attorney, Agent, or Firm*—Charles E. Cates

[57] ABSTRACT

A flexible, composite solar control sheet for use on a motor vehicle window has a vignette pattern in the film area above the driver's sight line that, in its darkest area, transmits less than 45% (preferably 10:30%) of visible light, and reflects less than 35% of the visible light; the composite having a first polymeric stratum of oriented polyethylene terephthalate (PET) to a surface of which is applied, by conventional vacuum deposition, a vignette layer of a suitable metal, e.g., 85:15, nickel-chromium alloy, or stainless steel, that in the area above the driver's sightline, transmits less than 45% visible light, and reflects less than 35% visible light; the first stratum being bonded to a second stratum of dye-treated PET which transmits about 35% to 70% visible light, the composite being protected on the exposed surface of the second stratum by a hard coat and containing a UV absorber; the composite then being combined with a motor vehicle window with the first stratum facing the inside surface of the motor vehicle window and the darkest area of the vignette disposed above the driver's sight line. The dye may be put in the laminating adhesive instead of the second stratum. A method of making is disclosed.

10 Claims, 1 Drawing Sheet

SOLAR CONTROL WINDOW FILM

This application is a continuation of the copending application Ser. No. 06/655,336, filed Sept. 27, 1984, now abandoned.

BACKGROUND OF THE INVENTION

I. Field of the Invention

This invention relates to window film, more particularly to solar control film used for retrofit improvement of motor vehicle windows.

II. Description of the Prior Art

Window film for motor vehicle windows, which film was dyed in a vignette pattern to admit relatively little light above the sight line and was shaded down to clear film below the driver or passenger's sight line, was first introduced for use in original equipment laminated windshield glass and was the subject of U.S. Pat. Nos. issued to Ryan, 2,609,269; 2,636,420 and 2,639,687. The film was dipped in an appropriate dye for a controlled time to produce a gradient from dark to light, which will be referred to hereinafter as a vignette, and the film was sandwiched between panes of glass to make a safety windshield.

More recently, polymeric film useful for retrofit application to existing motor vehicle windows has been introduced to the automotive aftermarket.

Wildorf, for example, in U.S. Pat. Nos. 3,775,226 and 3,891,486 has a well rounded discussion of the prior art retrofit window film, and describes a typical prior solar control film comprising a polymeric sheet, a vapor deposited aluminum coat, a protective polymeric coat, and a pressure sensitive coat, which is deactivated initially by the presence of an agent that eliminates tack during storage, as well as during the time the film is being applied to the window, etc. Wildorf shows a laminated sequence of a moisture permeable polymeric stratum, a bonding stratum, a vapor deposited aluminum stratum, and a second moisture permeable polymeric stratum. All of these strata except the aluminum stratum are optically clear and transparent. The polymeric strata are made of a polyester such as polyethylene terephthalate. The vapor deposited aluminum stratum referred to is produced by controlled density, vapor vacuum deposition upon the surface of polymeric stratum, which produces a uniform thickness of metal. The polymeric strata range in thickness from ¼ mil to 1 mil, preferably one-half mil. The vapor deposited aluminum has a thickness of no more than 300 angstrom units and is characterized by a light transmission of 5% to 60%. It goes on to explain a preferred adhesive in thickness from 0.1 to 0.3 mil.

Wildorf discloses, as a preferred transparent polymeric film—a polyester—for this laminate, a biaxially oriented polyethylene terephthalate. Other polymers which can be made into suitable film include polyvinyl fluoride, polyvinylidene fluoride, polycarbonates, polystyrene, polymethyl, methacrylate, polyamides, ionomers, etc. as well as esters and mixed esters of cellulose, and stabilizers against degradation caused by ultroviolet light may be included if desired. Film may also be made of a polymer of monomers consisting of essentially lower alkylene monomers; acrylonitrile, and polyethylene, polypropeylene and polyacrilonitrile.

Wildorf '486 also suggests that a colorant, preferably a dye, may be put in the adhesive stratum.

Wildorf's adhesive stratum is cast from a ketonic and/or alcoholic solution of the thermosetting polymer or acrylic. The solution preferably being applied to the clear film prior to superposing of the two polymeric films in the formation of the final product. For example, a polyester is Mylar, the acrylic is a methyl and/or ethyl methacrylate, the ketone is methylethyl and the alcohol is toluol.

Wildorf, U.S. Pat. No. 3,956,559 says his film has a pleasant soft grey color that permits excellent visibility (This is the natural color of aluminum on film, if looking through the film. Looking at the film, the impression is mirror-like). In other alternative embodiments Wildorf says that the polyester strata may be polyethylene terephthalate layers impregnated with fade resistant azo dyes.

Burger, U.S. Pat. No. 4,095,013 and Wildorf U.S. Pat. No. 3,949,134 show the use of a cling adhesive.

The conventional prior art method of depositing metal on polymeric film is vacuum deposition because it is faster, is dependable, and is inexpensive. A special kind of vacuum deposition of metal involves the sputtering method, which is substantially more expensive. For the purpose of this application vacuum deposition other than sputtering will be referred to as conventional vacuum deposition.

Applicant is not aware of any public use, knowledge, or writing prior to this invention that appreciates and teaches, for use on windows, the benefits of the steps of tinting polymeric film followed by high density vignette metallizing by conventional vacuum deposition of a second polymer foil, and laminating the two polymeric foils with the metal stratum positioned outwardly relative the auto interior and the dye layer, to produce a non-glare, high density, metallized composite.

In the retrofit automotive film industry, the conventional wisdom is that a composite film metallized by conventional vacuum deposition processes cannot be used on a vehicle because presenting the metallized surface to the outside would produce an unacceptable glare to persons outside the vehicle, and presenting the metallized surface to the inside of the vehicle would create hazardous glare or mirror effect to the occupant. In consideration of the glare factor, it was also thought necessary to put very low limits on the density of the metallic layer on the film. Consequently, the prior art constructions placed the metal to the inside facing the interior and at very low densities. In the prior art thinking and structures the degree of opacity to visible light transmission required to be effective in conventional vacuum metallizing of polymeric film would make the metal layers so highly reflective as to be unacceptable.

Since 1981 an additional constraint on allowable values of reflectivity have been imposed, and visible light reflectivity of greater than 35% has been banned by VESC 20. VESC is a voluntary association of state safety agencies and industry whose membership is dedicated to highway safety. Its members include all U.S. states and its standards usually become law in many states. Composite films cannot be made to conform to the reflectivity constraints with less than 45% transmission using conventional vacuum deposition techniques, although some success with sputtering exotic metals has been achieved. However, sputtering is a much more expensive method.

In the prior art, a light transmission on the order of 20–30%, for example, implies reflectivity of 70–80%.

Accordingly, it is a goal of this invention to create a composite film that has an area of very low light transmission, as low as 10% for example (a high density), and no greater than 35% reflectivity, by means of conventional vacuum deposition of metal. This invention is concerned with how that goal is met.

Definitions

As used herein:

"High metal density" implies less than about 45% light transmission and implies unacceptable glare.

"Low metal density" implies a light transmission greater than about 45%.

"Conventional vacuum deposition of metal" includes resistive and inductive vacuum metallizing and excludes sputtering.

"Unacceptable reflectance" means greater than about 35%.

"PET" means polyethylene terephthalate.

"Dye" includes dyes generally, pigments and transparent metal oxides unless otherwise required by the context.

"Vignette" means a layer of substance tapering from thick to thin or nonexistent which results in a visual effect from dark to light.

PROCESS

Brief Summary of the Invention

This invention draws on the surprising discovery thay by applying a metal layer, by conventional vacuum deposition, using a metal that, deposited at a density great enough to reduce the transmission of visible light to less than about 45%, reflects no more than about 35% of the visible light, to a first stratum of polymeric film, which stratum is in turn bonded to a second dye-treated polymeric stratum having a light transmission value greater than 35%, a composite film having a light transmission value in the area above the driver's sight line of less than 35% and reflectivity less than about 35% is obtained. In a preferred embodiment, the area of greatest density is at the top of the window and tapers off in a vignette to low density below the sight line.

An additional unexpected benefit is that the metal may now be positioned outwardly of the most useful area of the dye where it serves to protect the sensitive dye in the plastic film from fading.

Thus, a significant advance in retrofit application of plastic film to motor vehicle windows can be achieved: a vignette wherein light transmission through the top portion of the window above the passenger's sight line can be greatly reduced using a composite incorporating a layer of metal, applied by conventional vacuum deposition, having a high density that would otherwise create an unacceptable reflectance.

Briefly, in its broadest aspect, the invention contemplates the provision of a first polymeric film stratum including a high density layer of metal but low reflectance and a second polymeric stratum having a coat of dye on a first surface, or impregnated in the film, and means for laminating the film strata. The dye may be applied by any conventional means known to the art, such as coating, dipping, spraying and printing, but coating is presently preferred. The metal layer is applied by conventional vacuum metal deposition.

In a more specific embodiment, the invention is a first sheet of oriented polyethylene terephthalate which carries a vignette layer of metal having an area of high density applied by conventional vacuum deposition laminated adhesively to a second sheet of dye impregnated polymer, preferably polyethylene terephthlalate.

In yet another more specific embodiment, a first sheet of PET, to which a layer of an alloy of nickel: chromium, for example, 85:15, is applied by means of conventional vacuum deposition, is laminated to a film of PET coated with dye. Alternatively, the polyester may be coated with a laminating adhesive impregnated with a dye, or pigment, or a combination of the two. Any suitable dye or pigment may be used in the adhesive. Examples of dyes are known to the prior art and available. Preferred is a polyester adhesive impregnated with a very finely ground carbon black which appears grey in use.

The laminate may be finished by applying a hard coat, i.e., a scratch resistant coat of any of the types already known to the art. The laminate is prepared for mounting on a vehicle window by any well-known adhesive mounting means.

All of the above film embodiments are within the value limits above specified and are adhered to the inside surface of a motor vehicle window and positioned with the metal layer exterior (relative the motor vehicle (interior) to the dye to make a motor vehicle solar control window structure.

DETAILED DESCRIPTION OF THE PRESENTLY PREFERRED EMBODIMENT

Turning now to the drawings which may be useful in considering the presently preferred embodiments of this invention:

Figure 1:
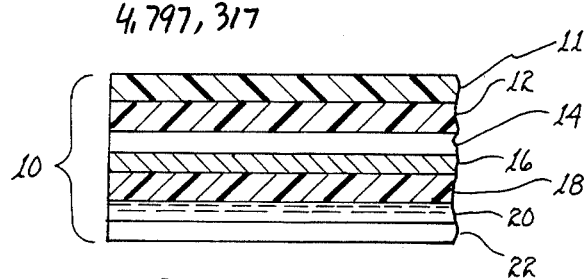
FIG. 1 is a cross-section of a composite made according to the teachings of this invention.

FIG. 1 shows a cross-section of a presently preferred embodiment of the invention. The numeral 10 refers generally to the laminate which includes scratch resistant coating 11 applied to a dye impregnated film 12 made of oriented polyethylene terephthalate. Film 12 is a substrate prepared by dipping the film in any one of a number of dye stuffs known to the industry to be suitable for this purpose, according to the color desired. Such a dyed film may be obtained from Martin Processing, Incorporated, Martinsville, VA. as a UV stabilized 70% light transmission grey. The Martin film is a dipped film which is impregnated throughout.

A 0.1 mil layer of Morton 76R36 laminating adhesive layer 14 joins the dyed polyester film substrate 12 to 48 gauge polyethylene terephthalate stratum 18 to which has been applied, by conventional vacuum deposition, a vignette layer 16 of nickel-chromium alloy tapering away from an initial thickness of approximately 140 angstroms which may vary ±20 angstroms. Surprisingly, the effect of the metallized layer 16 as a barrier to undesired visible light is retained without the unacceptable high visual light reflectance that would be expected for that density and thickness of metal.

The presently preferred polymeric film for metallizing may be obtained from Imperial Chemical Company under the trademark ICI-442, and from American Hoechst under the trademark Hostaphan 5000. The methods of dyeing and metallizing polymeric film, the dyes and metals suitable therefor, the adhesives and other means for joining film to film and mounting film on window glass are all well-known to the art and no claim to such elements per se are made in this invention, other than in combination with other elements here disclosed and claimed, whereby the invention is considered as a whole.

The laminating adhesives presently preferred for joining layers 12 and 18 are polyester resins made by DuPont under the trademark Eplam and by Morton Chemical Co., whose stock identification number of 76R-36.

Film 18 is protected by release liner 22 until the laminate 10 is ready for mounting on motor vehicle window glass 24. At that time the release liner 22 is peeled away and the laminate 10 is mounted on glass 24 by means of a 0.25 mil thickness layer of adhesive 20. Any of a family of acrylic or polyester resins may be used as mounting adhesive. The presently preferred resin is National 80-1057. Another useful adhesive is Monsanto's RA-1159.

Figure 2:
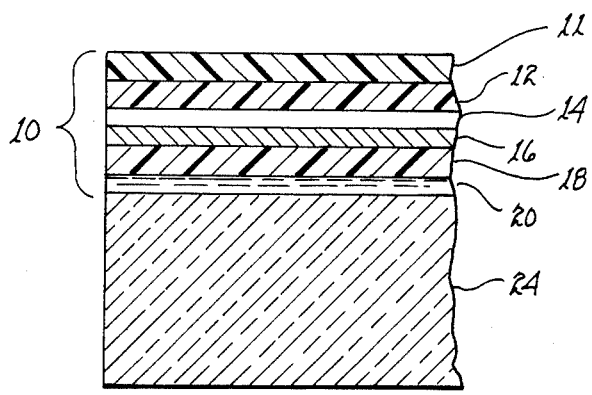
FIG. 2 is a cross-section of the laminate of FIG. 1 applied to a motor vehicle window to make a solar control structure.

In FIG. 2 it may be seen that in that figure the release liner 22 has been removed and the laminate 10 has been adhered to window glass 24 by means of adhesive layer 20.

Figure 3:
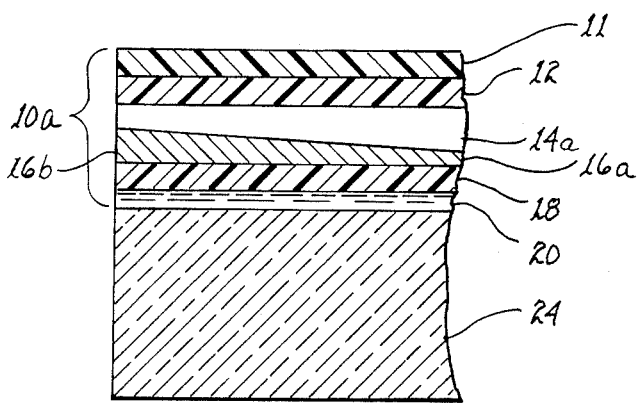
FIG. 3 is an alternative embodiment of the structure of FIG. 2.

In an alternative embodiment, any oil soluble dye known to the art to be suitable and compatible with the adhesive used may be incorporated in the laminating adhesive 14. In this alternative embodiment it is not necessary to dye the film per se inasmuch as that function will be performed by the dyed adhesive. In FIG. 3 it may be seen that instead of impregnating the layer of polymer film 12 with dye, the dye has been dispersed in laminating adhesive 14a. In the FIG. 3 alternative embodiment the dye-impregnated adhesive layer 14(a) is coated on polymeric layer 12 by gravure cylinder or Mayer rod.

The preferred embodiment of metal layer for all composite films is shown in FIG. 3. The metal layer 16a tapers from a high density area 16b toward a lower density area to create the vignette effect.

In both FIGS. 2 and 3 the arrow points to the outside of the motor vehicle. The film is mounted on the inside and, as appears from the drawings, the metal is mounted to the exterior side relative the dyed film 12.

In the manufacture of the presently preferred embodiment, the dye-treated stratum 12, a roll of 92 to 48 gauge dye-impregnated PET 70% light transmission film is obtained from Martin Processing, Incorporated, Martinsville, VA. and is hard coated, with an approximately 4 micron thick coating or layer 11 of a scratch and abrasion resistant plastic material such as cured organopolysiloxane compound.

A second roll of untreated 48 gauge PET is obtained from Imperior Chemical Company. This film is identified by the manufacturer as ICI 442. The latter 48 gauge roll is then prepared on one surface with a vignette of nickel-chromium applied by conventional vacuum deposition known to the art, i.e., inductive and resistive metallizing by usual methods.

The polyester film is metallized in bands of dark tapering to light which are later cut to achieve the desired vignette. For example, a dark band is vignetted to either side, with the darkest portion in the center being about 35% light transmission over an area of 5 inches, tapering down on either side to 100% transmission. The total band width is approximately 10 inches. The metallized film is then laminated to the dye-impregnated polyethylene terephthalate film which has a uniform 70% light transmission.

The thickness of the pigmented adhesive may be varied while keeping the concentration of pigment constant, using a variable etched gravure cylinder to apply different coating weights of the same concentration to achieve varying light transmission densities. The values of the colored adhesive would be 50% light transmission at the darkest band tapering to 70% at a band width of about 10 inches.

The resulting metallized and dyed films are laminated, it being understood that the laminating adhesive may contain the color in an alternative embodiment. The mounting adhesive with a release liner is then applied. Then the finished composite may be cut down the center to yield two rolls of a predetermined desired gradient of light transmission from top to bottom (from middle to side at the time of cut). Typically a composite sheet of polymer 40 inches wide is metallized in a band wherein the average light transmission in the middle 5 inches is about 22% permissibly ranging from 10 to 30% and in the two one-half inches on either side about 20 to 70% with a gradient from middle to outside; and beyond that about 70%. The roll is trimmed and cut from auto windows such that the film can be positioned to have the dark portion cover the part of the window above the sight line. The film area below the driver's sight line will have a 70% value of light transmission. Any excess width from the roll is discarded.

EXAMPLE

A 48# ga ICI442 Polyester film was metallized with 85:15 nickel:chromium alloy in a dark band which was vignetted to either side, with the darkest portion in the center being 35% light transmission over an area of 5 inches tapering down on either side to 100% transmission. The total width was approximately 10".

A 4 micron thick hardcoat was applied by gravure coating to a uniform dye-impregnated 48 ga. polyethylene terephthalate film which has a 70% light transmission obtained from Martin Processing, Inc.

These two films were then laminated together forming a 150 ga composite with the hard coat being on one of the outer surfaces. The non-hard coated surface was then coated with a pressure sensitive mounting adhesive combined to a protective silicone liner with the silicone coated side facing the adhesive.

The total composite was then slit in half thereby separating the web at the center of the band. The edges were trimmed at the same time to produce a 20" finished product with the vignette on one edge.

Stainless steel may be used as the metal layer. It is also predicted that an aluminum oxide, suitably treated and applied in two depositions, would work.

What is claimed is:

1. A flexible, solar control, composite sheet for use on the inside surface of a motor vehicle window comprising:
   (a) a first polymeric stratum having a high density layer applied by conventional vacuum deposition to a just surface, at least a portion of said high density layer having a density great enough to reduce the visible light transmission value to less than about 45% and the reflectance of visible light to no more than about 35%, said high density layer being a substance selected from the group consisting of nickel, chromium, alloys of nickel and/or chromium, stainless steel, and aluminum oxide;

(b) a second polymeric, dye-treated stratum bonded to the said first surface of said first polymeric stratum, and having light transmission values from about 35% to 70%; and (c) means for adhering said first polymeric stratum to the inside surface of a motor vehicle window.

2. The composite sheet of claim 1 wherein the high density layer is applied in a vignette pattern.

3. The composite sheet of claim 2 wherein said composite vignette has an area ranging from 10 to 30% light transmissivity and a second area from 20 to 70% light transmissivity, and no more than about 35% reflectivity.

4. The composite sheet of claim 1 wherein the means for bonding said first and second polymeric strata is a laminating adhesive.

5. The composite sheet of claim 4 wherein said laminating adhesive is present in a thickness not exceeding about 0.1 mil.

6. The composite sheet of claim 1 wherein the substance of the high density layer is an alloy of nickel and chromium.

7. The composite sheet of claim 6 wherein the substance of the high density layer is about 85:15 nickel:chromium alloy.

8. The composite sheet of claim 1 wherein said second stratum is impregnated with the dye.

9. The composite sheet of claim 1 wherein said second stratum is laminated to said first stratum with adhesive impregnated with dye.

10. The composite sheet of claim 1 with the addition of a hard coat protecting the exposed surface of the second stratum.

* * * * *

UNITED STATES PATENT AND TRADEMARK OFFICE
CERTIFICATE OF CORRECTION

PATENT NO. : 4,797,317
DATED : January 10, 1989
INVENTOR(S) : Dell B. Oliver, Peter Jahoda It is certified that error appears in the above-identified patent and that said Letters Patent is hereby corrected as shown below:

Column 6, line 61, claim 1, change "just" to ---first---.

Signed and Sealed this

Thirtieth Day of May, 1989

Attest:

DONALD J. QUIGG

Attesting Officer

Commissioner of Patents and Trademarks